US007630977B2

(12) United States Patent
Gaussier et al.

(10) Patent No.: US 7,630,977 B2
(45) Date of Patent: Dec. 8, 2009

(54) CATEGORIZATION INCLUDING DEPENDENCIES BETWEEN DIFFERENT CATEGORY SYSTEMS

(75) Inventors: Eric Gaussier, Eybens (FR); Jean-Michel Renders, Saint Nazaire les Eymes (FR); Cyril Goutte, Le Versoud (FR); Caroline Privault, Montbonnot (FR)

(73) Assignee: Xerox Corporation, Norwalk, CT (US)

( * ) Notice: Subject to any disclaimer, the term of this patent is extended or adjusted under 35 U.S.C. 154(b) by 570 days.

(21) Appl. No.: 11/170,033

(22) Filed: Jun. 29, 2005

(65) Prior Publication Data

US 2007/0005639 A1    Jan. 4, 2007

(51) Int. Cl.
*G06F 17/30* (2006.01)
(52) U.S. Cl. .............................................. 707/5; 707/7
(58) Field of Classification Search ........................ None
See application file for complete search history.

(56) References Cited

U.S. PATENT DOCUMENTS

| | | | | |
|---|---|---|---|---|
| 6,457,010 | B1 * | 9/2002 | Eldering et al. | 707/10 |
| 6,839,680 | B1 * | 1/2005 | Liu et al. | 705/10 |
| 6,865,567 | B1 * | 3/2005 | Oommen et al. | 707/2 |
| 6,961,678 | B2 * | 11/2005 | Feldman | 702/189 |
| 6,963,854 | B1 * | 11/2005 | Boyd et al. | 705/37 |
| 2003/0101451 | A1 * | 5/2003 | Bentolila et al. | 725/34 |
| 2006/0053123 | A1 * | 3/2006 | Ide et al. | 707/100 |
| 2006/0083429 | A1 * | 4/2006 | Joly | 382/228 |

FOREIGN PATENT DOCUMENTS

WO    WO 2004/055639    7/2004

OTHER PUBLICATIONS

U.S. Appl. No. 10/774,966, filed Feb. 9, 2004, Goutte et al.
Nakayama et al., "Subject Categorization for web Educational Resources Using MLP," In *Proceedings of European Symposium on Artificial Neural Networks*, 2003.
Rosipal et al., "Kernel PLS-SVC for Linear and Nonlinear Classification," In *Proceedings of International conference on Machine Learning*, 2003.
Bianchi et al., "Incremental Algorithms for Hierarchical Classification," In *To appear in Proceedings of Conference on Neural Information Processing Systems*, 2004.
Tsochantaridis et al., "Support Vector Machine Learning for Interdependent and Structured Output Spaces," In *Proceedings of International Conference on Machine Learning*, 2004.

(Continued)

*Primary Examiner*—Neveen Abel Jalil
*Assistant Examiner*—Bai D Vu
(74) *Attorney, Agent, or Firm*—Fay Sharpe LLP

(57) ABSTRACT

In categorizing an object respective to at least two categorization dimensions each defined by a plurality of categories, a probability value indicative of the object is determined for each category of each categorization dimension. A categorization label for the object is selected respective to each categorization dimension based on (i) the determined probability values of the categories of that categorization dimension and (ii) the determined probability values of categories of at least one other of the at least two categorization dimensions.

18 Claims, 3 Drawing Sheets

OTHER PUBLICATIONS

Dekel et al., "Large Margin Hierarchical Classification," In *Proceedings of International Conference on Machine Learning*, 2004.

Hofmann et al., "Learning with Taxonomies: Classifying Documents and Words," In *NIPS Workshop on Syntax, Semantics and Statistics*, 2004.

Smith et al., "Multimedia semantic indexing using model vectors," Int'l Conference, Piscataway, NJ, IEEE, vol. 2, pp. 445-448, Jul. 6, 2003.

Torkkola, "Discriminative features for document classification," 16th Int'l Conference, IEEE, vol. 1, pp. 472-475, Los Alamitos, CA, Aug. 11, 2002.

* cited by examiner

CATEGORIZATION INCLUDING DEPENDENCIES BETWEEN DIFFERENT CATEGORY SYSTEMS

INCORPORATION BY REFERENCE

The following copending, commonly assigned applications: Incremental Training for the Probabilistic Latent Categorizer (Ser. No. 11/170,019 filed Jun. 29, 2005); Method for Multi-Class, Multi-Label Categorization Using Probabilistic Hierarchical Modeling (Ser. No. 10/774,966 filed Feb. 9, 2004); are herein incorporated by reference.

BACKGROUND

The following relates to the information arts. It particularly relates to double-view categorization of documents using two sets or systems of categories, and will be described with particular reference thereto. It relates more generally to categorization of objects such as documents, images, video, audio, or so forth, using two or more sets of categories.

Categorization is the process of assigning a given object to one or more pre-defined categories. Automatic categorization methods usually start with a training set of categorized objects, and infer therefrom a categorization model used to categorize new objects. More generally, categorization can be performed with respect to two or more sets of categories. Each set of categories defines a categorization dimension (also called a categorization view). The specific case of double-view categorization employs two categorization dimensions. More generally, three or more categorization dimensions can be employed.

The training set of objects is used to optimize parameters of a categorization model associated with each categorization dimension or view. Subsequently, the optimized categorization models are used to categorize new and uncategorized objects. In this approach, the categories of the various categorization dimensions are usually assumed to be statistically independent. However, there may be interdependency between categories of different categorization dimensions.

Interdependencies can be incorporated into multi-dimensional or multiple-view categorization by defining a combination view that explicitly combines the categories of different dimensions or views, and developing a complex categorization model for the combination view. For example, in the case of a double-view document categorization employing a "topic" categorization dimension (e.g., "art", "music", "science", and so forth), and a "language" categorization dimension (e.g., "French", "English", "German", and so forth), these two categorization dimensions are readily combined to define a "topic/language" categorization dimension having categories such as: "art/French", "art/English", "art/German", "music/French", "music/English", "music/German", "science/French", "science/English", "science/German", and so forth. In this approach the combined "topic/language" dimension has a large number of categories. For example, if the "topic" categorization dimension includes 15 categories and the "language" categorization dimension includes 20 categories, the combined "topic/language" categorization dimension includes 15×20=300 categories. This large number of categories results in a correspondingly complex categorization model for the combined "topic/language" view that is difficult to train.

Moreover, this complex model approach is inflexible. For example, if some documents are to be categorized by both topic and language while other documents are to be categorized only with respect to language, the complex "topic/language" categorization model inefficiently performs categorization by language only. A separate and distinct "language" categorization model can be constructed and trained for use in language-only categorization tasks, but this introduces inefficient redundancy. Conversely, if trained categorization models already exist for the component views (e.g., "topic" and "language"), these existing models are not readily usable for training the combined "topic/language" categorization model, again leading to inefficient redundancy.

BRIEF DESCRIPTION

Some aspects of the present disclosure in embodiments thereof include a method for categorizing an object respective to at least two categorization dimensions. Each categorization dimension is defined by a plurality of categories. A probability value indicative of the object is determined for each category of each categorization dimension. A categorization label for the object is selected respective to each categorization dimension based on (i) the determined probability values of the categories of that categorization dimension and (ii) the determined probability values of categories of at least one other of the at least two categorization dimensions.

Some aspects of the present disclosure in embodiments thereof include an apparatus for categorizing an object respective to at least two categorization dimensions. Each categorization dimension is defined by a plurality of categories. Categorization models corresponding to each categorization dimension are evaluated respective to the object to determine a probability value indicative of the object for each category of each categorization dimension. A labeling module selects a categorization label for the object respective to each categorization dimension based on (i) the determined probability values of the categories of that categorization dimension and (ii) the determined probability values of categories of at least one other of the at least two categorization dimensions.

Some aspects of the present disclosure in embodiments thereof include a method for categorizing an object. The object is independently categorized with respect to at least two categorization dimensions each defined by a plurality of categories. The independent categorizing with respect to each categorization dimension is performed independently from the independent categorizing with respect to any other categorization dimension. The independent categorization with respect to one categorization dimension is adjusted based on the independent categorization with respect to another categorization dimension.

DETAILED DESCRIPTION

In an example double-view categorization, the first view or categorization dimension is defined by a set of categories denoted herein as $C^{(1)}$, and the second view or categorization dimension is defined by a set of categories denoted herein as $C^{(2)}$. The $C^{(1)}$ categorization dimension has an associated categorization model denoted $M^{(1)}$, while the $C^{(2)}$ categorization dimension has an associated categorization model denoted $M^{(2)}$. An object or document to be categorized is denoted herein as x. If interdependencies between the $C^{(1)}$ and $C^{(2)}$ dimensions are not taken into account, then the categorization of document x can be performed independently in each of the $C^{(1)}$ and $C^{(2)}$ categorization dimensions. In this case, denoting a category of interest in the $C^{(1)}$ categorization dimension as $c^{(1)}$, a probability value indicative of the object for the category $c^{(1)}$ is suitably given as:

$$P(c^{(1)}|x, M^{(1)}) \qquad (1),$$

and, denoting a category of interest in the $C^{(2)}$ categorization dimension as $c^{(2)}$, a probability value indicative of the object for the category $c^{(2)}$ is suitably given as:

$$P(c^{(2)}|x, M^{(2)}) \qquad (2).$$

A categorization label for x in the $C^{(1)}$ categorization dimension is suitably selected as that category having the highest probability value given by Equation (1). A categorization label for x in the $c^{(2)}$ categorization dimension is suitably selected as that category having the highest probability value given by Equation (2). These categorizations neglect interdependencies between the $C^{(1)}$ and $C^{(2)}$ dimensions.

It is desirable to take into account interdependencies between the $C^{(1)}$ and $C^{(2)}$ dimensions without discarding the probability values computed in Equations (1) and (2) and without computing an additional combination categorization model (other than the models $M^{(1)}$ and $M^{(2)}$ constructed for the $C^{(1)}$ and $C^{(2)}$ categorization dimensions). Category interdependencies are taken into account herein by mapping between (i) the input sets of categories $C^{(1)}$ and $C^{(2)}$ defining the categorization dimensions, and (ii) an output set of categories which take into account interdependencies between categories of the $C^{(1)}$ and $C^{(2)}$ categorization dimensions. In some embodiments, the output set of categories is the same as the input $C^{(1)}$ and $C^{(2)}$ sets of categories, but with probability values reweighted to account for category interdependencies. These embodiments are referred to herein as reweighting solutions. In other embodiments, the output set of categories is a set of derived categories in which each derived category corresponds to a combination of categories from different categorization dimensions, such as ordered pairwise combinations of categories from the $C^{(1)}$ and $C^{(2)}$ categorization dimensions. These embodiments are referred to herein as direct solutions.

Figure 1:
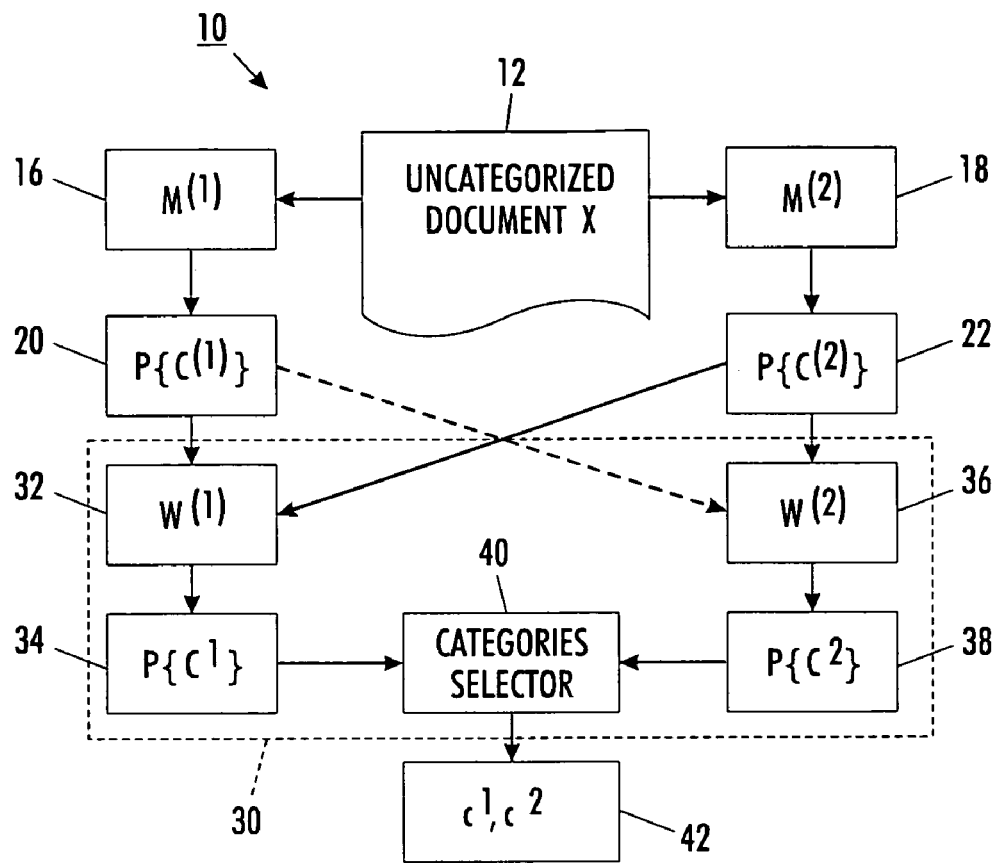
FIG. 1 illustrates a double-view categorizer incorporating category interdependency relationships implemented by reweighting of the probability values of categories based on the probability values of other categories.

With reference to FIG. 1, a reweighting double-view categorizer 10 receives an example uncategorized document x 12. The document is input to the categorization model $M^{(1)}$ 16 and into the categorization model $M^{(2)}$ 18. The categorization model $M^{(1)}$ 16 analyzes the document object x 12 in accordance with Equation (1) and outputs a set of probability values $P\{C^{(1)}\}$ 20 for the categories defining the categorization dimension $C^{(1)}$. The categorization model $M^{(2)}$ 18 analyzes the document object x 12 in accordance with Equation (2) and outputs a set of probability values $P\{C^{(2)}\}$ 22 for the categories defining the categorization dimension $C^{(2)}$. The probability values $P\{C^{(1)}\}$ 20 and $p\{C^{(2)}\}$ 22 do not take into account interdependencies between the categories of the categorization dimension $C^{(1)}$ and the categories of the categorization dimension $C^{(2)}$.

A labeling module 30 selects a categorization label for the document object x 12 respective to each categorization dimension $C^{(1)}$ and $C^{(2)}$ based on (i) the determined probability values of the categories of that categorization dimension and (ii) the determined probability values of categories of the other of the at least two categorization dimensions. In the reweighting labeling module 30, a weighting processor 32 applies weightings to the probability values $P\{C^{(1)}\}$ 20 associated with the categories of the categorization dimension $C^{(1)}$ to produce output weighted probability values $P\{C^1\}$ 34. The weightings applied by the weighting processor 32 are based on probability values $P\{C^{(2)}\}$ 22 of categories of the categorization dimension $C^{(2)}$. Similarly, a weighting processor 36 applies weightings to the probability values $P\{C^{(2)}\}$ 22 associated with the categories of the categorization dimension $C^{(2)}$ to produce output weighted probability values $P\{C^2\}$ 38. The weightings applied by the weighting processor 36 are based on probability values $P\{C^{(1)}\}$ 20 of categories of the categorization dimension $C^{(1)}$.

A categories selector 40 of the labeling module 30 labels the document object x 12 respective to the categorization dimension $C^{(1)}$ with a category $c^1$ having a highest value of the weighted probability values $P\{C^1\}$ 34. Similarly, the categories selector 40 labels the document object x 12 respective to the categorization dimension $C^{(2)}$ with a category $c^2$ having a highest value of the weighted probability values $P\{C^2\}$ 38. The labeling categories $c^1$, $c^2$ 42 are output by the reweighting. double-view categorizer 10 as the categorization of the document object x 12.

Figure 2:
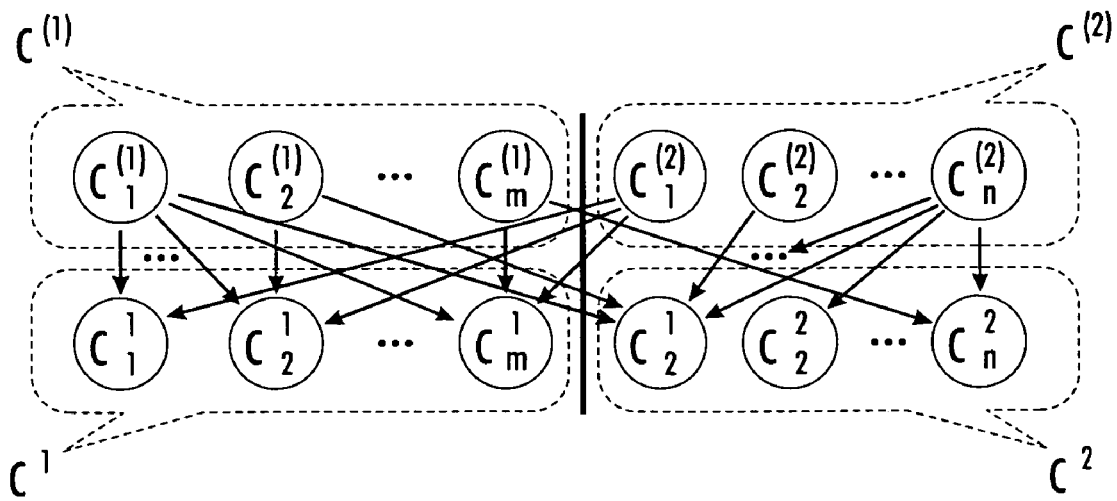
FIG. 2 diagrammatically illustrates reweighting of the probability values of categories of each categorization dimension in accordance with the double-view categorizer of FIG. 1.

With continuing reference to FIG. 1 and with further reference to FIG. 2, the weighting processor 32 weights the probability value of each category $c^{(1)}$ of the set of categories $C^{(1)}$ with weighting due to probability values of categories $c^{(2)}$ of the set of categories $C^{(2)}$ to produce weighted output categories $c^1$ defining the weighted set of categories $C^1$. In general, the probability value for a specific weighted category $c^1$ is given by:

$$P(c^1 | x, M^{(1)}, M^{(2)}) = \sum_{c^{(1)}} \sum_{c^{(2)}} P(c^1, c^{(1)}, c^{(2)} | x, M^{(1)}, M^{(2)}), \qquad (3)$$

which can be rewritten as:

$$P(c^1 | x, M^{(1)}, M^{(2)}) = \qquad (4)$$
$$\sum_{c^{(1)}} \sum_{c^{(2)}} P(c^1, c^{(1)}, c^{(2)} | x, M^{(1)}, M^{(2)}) \cdot P(c^1, c^{(1)} | c^{(2)}, x, M^{(1)}, M^{(2)}),$$

which can be further rewritten as:

$$P(c^1 | x, M^{(1)}, M^{(2)}) = \qquad (5)$$
$$\sum_{c^{(1)}} \sum_{c^{(2)}} P(c^{(2)} | x, M^{(2)}) \cdot P(c^{(1)} | x, M^{(1)}) \cdot P(c^1 | c^{(1)}, c^{(2)}).$$

It will be observed that Equation (5) is constructed using the probability values of Equations (1) and (2), which are computed without category interdependency weightings, adjusted by interdependency weighting factors of the form $P(c^1|c^{(1)},c^{(2)})$. Assuming that there are no statistical interdependencies between the categories of the categorization dimension $C^{(1)}$, that is, assuming that:

$$P(c^1=i|c^{(1)}=j,c^{(2)}=k)=\delta(i,j)\cdot P(c^1=i|c^{(2)}=k) \quad (6)$$

where i, j, and k are indices and $\delta$ is the Krönecker delta function, Equation (5) can be still further rewritten as:

$$P(c^1 = i | x, M^{(1)}, M^{(2)}) = \quad (7)$$

$$\sum_k P(c^{(2)} = k | x, M^{(2)}) \cdot P(c^{(1)} = i | x, M^{(1)}) \cdot P(c^1 = i | c^{(2)} = k),$$

where the index k ranges over all the categories of the categorization dimension $C^{(2)}$. Alternatively, if it is known that only certain categories of the categorization dimension $C^{(2)}$ have significant interdependence with categories of categorization dimension $C^{(1)}$, then the index k can range over only those categories of the categorization dimension $C^{(2)}$ that are interdependent with categories of the categorization dimension $C^{(1)}$. Again, it will be observed that Equation (7) is constructed using the statistically independent probability values of Equations (1) and (2), written with reference to indices i and k, adjusted by category interdependency weighting factors of the form $P(c^1=i|c^{(2)}=k)$. Repeating the operations of Equations (3)-(7) for the categorization dimension $C^{(2)}$ yields:

$$P(c^2 = j | x, M^{(1)}, M^{(2)}) = \quad (8)$$

$$\sum_k P(c^{(1)} = k | x, M^{(1)}) \cdot P(c^{(2)} = j | x, M^{(2)}) \cdot P(c^2 = j | c^{(1)} = k).$$

Figure 3:
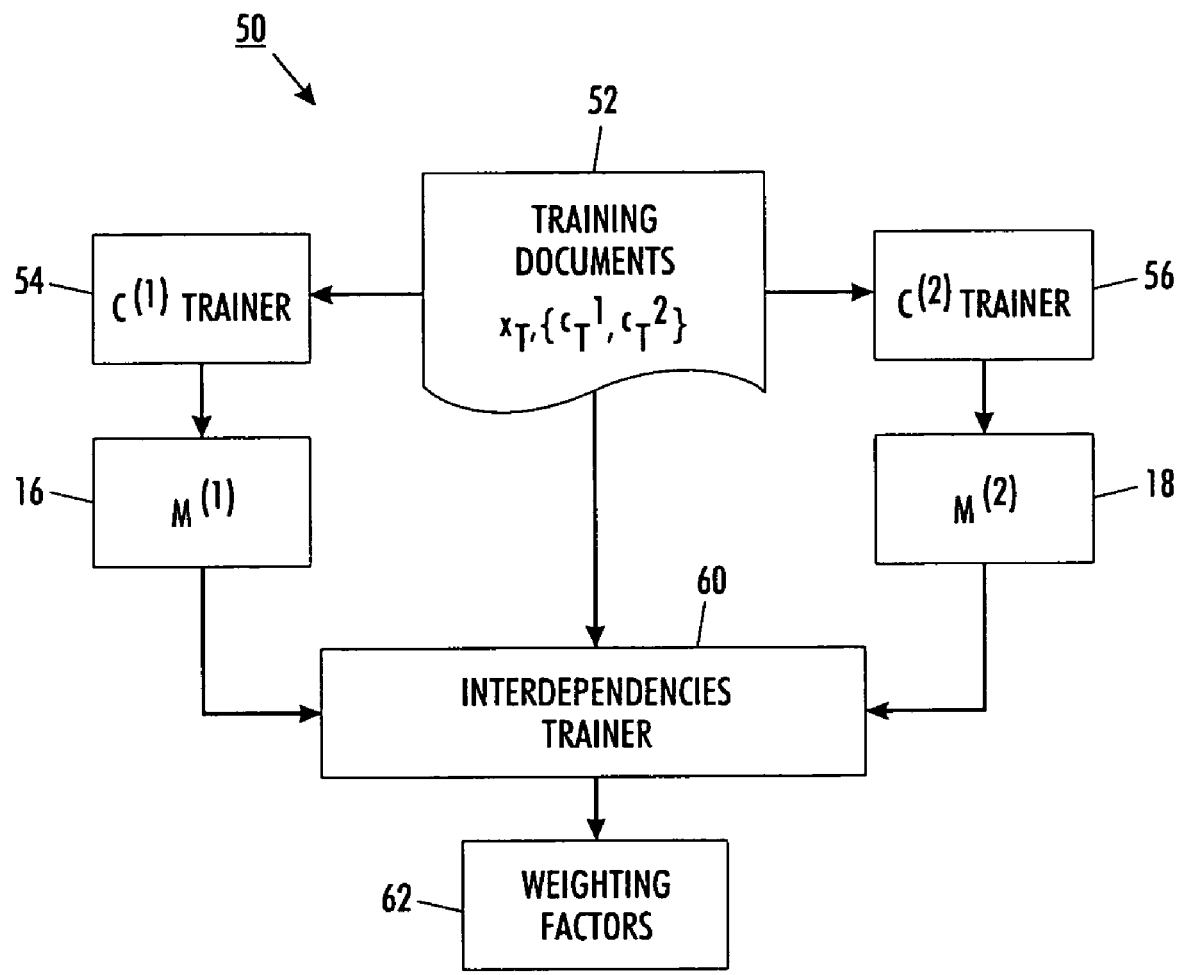
FIG. 3 illustrates a training system for training the double-view categorizer of FIG. 1.

With reference to FIG. 3, a suitable trainer 50 for training the reweighting double-view categorizer 10 of FIG. 1 is illustrated. Training is performed using a set of training documents $X_T$ 52, each of which has known category values $\{C_T^1, C_T^2\}$. A first trainer 54 employs the training documents 52 to train the categorization model $M^{(1)}$. Typically, such training involves optimizing parameters of the categorization model $M^{(1)}$ respective to the known category labelings $C_T^1$ of the training documents $X_T$ 52. Similarly, a second trainer 56 employs the training documents 52 to train the categorization model $M^{(2)}$, making reference to the known category labelings $C_T^2$ of the training documents $X_T$ 52.

Once the statistically independent categorization models $M^{(1)}$, $M^{(2)}$ have been constructed and trained, only the weighting factors $P(c^1=i|c^{(2)}=k)$ for the $C^{(1)}$ categories and the weighting factors $P(c^2=j|c^{(1)}=k)$ for the $C^{(2)}$ categories are unknown in Equations (7) and (8). An interdependencies trainer 60 determines suitable values of these weighting factors 62. One suitable approach for determining values of the weighting factors $P(c^1=i|c^{(2)}=k)$ 62 is based on the maximum likelihood approach. Indexing the documents of the training documents $X_T$ 52 by an index r, the log-likelihood is suitably expressed as:

$$L = \sum_r \log(P(x_r, c_r^1, c_r^2 | M^{(1)}, M^{(2)})), \quad (9)$$

which can be rewritten as:

$$L = \sum_r \log(P(x_r | M^{(1)}, M^{(2)})) + \quad (10)$$

$$\sum_r \log\left(\sum_{c^{(1)}} \sum_{c^{(2)}} P(c_r^1, c_r^2, c_r^{(1)}, c_r^{(2)} | x_r | M^{(1)}, M^{(2)})\right).$$

In view of the independence condition of Equation (6), the second term of the right-hand side sum of Equation (10) can be written as:

$$\sum_r \log(P(c^{(1)} = c_r^1 | x_r, M^{(1)}) \cdot \quad (11)$$

$$P(c^{(2)} = c_r^2 | x_r, M^{(2)}) \cdot P(c_r^1 | c^{(2)} = c_r^2) \cdot P(c_r^2 | c^{(1)} = c_r^1)).$$

Taking the derivative of the log-likelihood of Equation (11) with respect to the weighting factors $P(c^1=i|c^{(2)}=k)$ under the constraint that the probability distribution sums to unity leads to:

$$P(c^1 = i | c^{(2)} = k) = \frac{\sum_r \delta(c_r^1, i) \cdot \delta(c_r^2, k)}{\sum_r \delta(c_r^2, k)}, \quad (12)$$

and similarly for the weighting factors $P(c^2=j|c^{(1)}=i)$ for the categories of the categorization dimension $C^{(2)}$. The skilled artisan will recognize that evaluation of Equation (12) involves computing relative frequencies of the joint observation of the categories of the training documents $X_T$ 52.

For the reweighted double-view categorization approach of FIGS. 1-3, if the categorization dimension $C^{(1)}$ includes M categories and the categorization dimension $C^{(2)}$ includes N categories, then there are $M^2+N^2+2\times M\times N-2\times M-2\times N$ possible weightings, corresponding to weighting each category respective to the other categories in the same dimension and respective to each category in the other dimension. Under the assumption of Equation (6) that categories within a categorization dimension are statistically independent, the number of weightings is reduced to $2\times M\times N-N-M$. Still further reduction in the number of interdependency weightings can be achieved by applying a priori information to omit cross-dimensional ordered category pairings having low interdependence. For example, if training based on the set of training documents $X_T$ 52 indicates a low dependence of a particular $c^{(1)}$ category on a particular $c^{(2)}$ category, then the corresponding reweighting is optionally omitted in applying the reweighting double-view categorizer 10.

Figure 4:
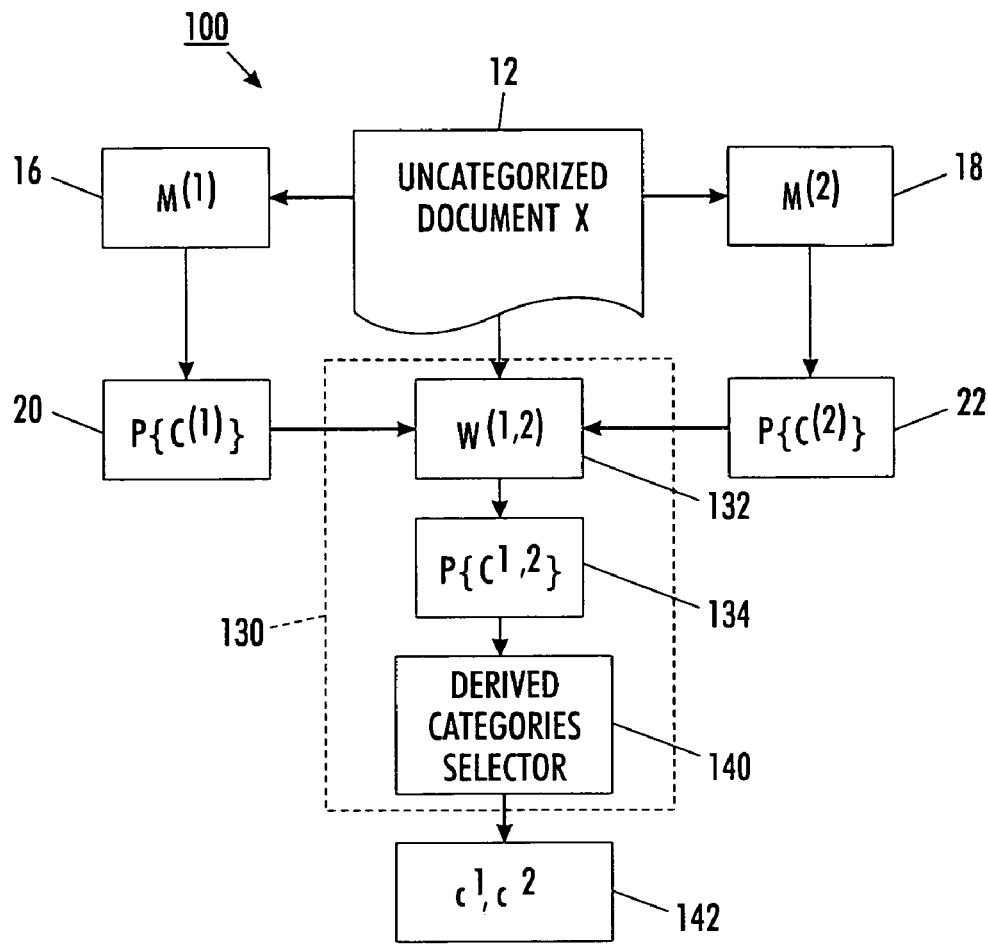
FIG. 4 illustrates a double-view categorizer incorporating category interdependency relationships implemented as ordered pairwise combinations of categories of the two categorization dimensions.

With reference to FIG. 4, a double-view categorizer 100 employs the direct approach to categorize the example uncategorized document x 12. The document is input to the categorization models $M^{(1)}$ 16 and $M^{(2)}$ 18 to produce the set of probability values $P\{C^{(1)}\}$ 20 and the set of probability values $P\{C^{(2)}\}$ 22, respectively, as in FIG. 1. A labeling module 130 selects a categorization label for the document object x 12 respective to each categorization dimension $C^{(1)}$ and $C^{(2)}$ based on (i) the determined probability values of the categories of that categorization dimension and (ii) the determined probability values of categories of the other of the at least two categorization dimensions. The labeling module 130 employs a direct approach to incorporation of category interdependencies.

Figure 5:
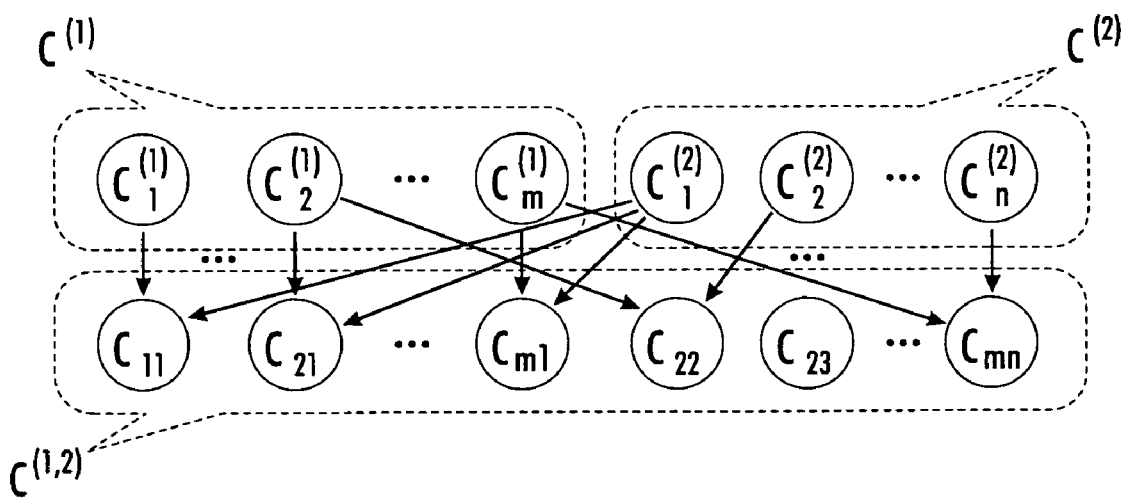
FIG. 5 diagrammatically illustrates the derivation of derived categories by ordered pairwise combination of categories of the two categorization dimensions in accordance with the double-view categorizer of FIG. 4.

With continuing reference to FIG. 4 and with further reference to FIG. 5, in the direct approach the sets of categories $C^{(1)}$ and $C^{(2)}$ are mapped to a set of derived categories $C^{(1,2)}$. Each derived category represents an ordered pairwise combination of two categories. If the categorization dimension $C^{(1)}$ includes M categories and the categorization dimension $C^{(2)}$ includes N categories, then the set of derived categories $C^{(1,2)}$ may in general include M+N derived categories, so that the number of possible weightings between the categories of $C^{(1)}$ and $C^{(2)}$ and $C^{(1,2)}$ may in general include up to (M+N)× M×N−M−N weights. Under the assumption of Equation (6), combination categories derived from the same categorization dimension are omitted, so that each derived category corresponds to a category of the categorization dimension $C^{(1)}$ and a category of the categorization dimension $C^{(2)}$ The number of derived categories is reduced to 2×M×N−M−N using the assumption of Equation (6). Still fewer derived categories can be employed if, for example, certain cross-dimensional category interdependencies are also deemed to be negligible based on a priori knowledge.

A derived categories module 132 of the labeling module 130 applies weighted probability values to the derived categories to produce a set of weighted probability values P{$C^{(1,2)}$} 134 associated with the derived categories $C^{(1,2)}$. Each weighted probability value computed by the derived categories module 132 is based on a probability value for one of the component categories making up the ordered pair weighted by the probability value for the other one of the component categories of the ordered pair. Typically, the derived categories module 132 applies an interdependency weighting factor associated with each derived category in determining the weighted probability for that derived category. A derived categories selector 140 of the labeling module 130 selects a derived category having a highest probability value, and labels the document object x 12 with categories $c^1$ and $c^2$ 142 from categorization dimensions $C^{(1)}$ and $C^{(2)}$, respectively, where categories $c^1$ and $c^2$ correspond to the selected derived category having the highest probability value. The labeling categories $c^1$, $c^2$ 142 are output by the direct double-view categorizer 100 as the categorization of the document object x 12.

In calculating the category interdependency weighting factors used by the labeling modules 30, 130, various approaches can be used. The interdependency weighting factors of Equation (12) is one approach. In other approaches, a neural network or perceptron network is employed. The network contains an input layer defined by the probability values for the sets of categories $C^{(1)}$, $C^{(2)}$ assigned to a document 12 by the categorization models $M^{(1)}$, $M^{(2)}$. The input layer is connected to zero, one or more hidden layers, which are in turn connected to the output layer made up of either a set of derived categories $C^{(1,2)}$ representing ordered pairs of input categories (these are direct approaches), or the reweighted categories $C^1$, $C^2$ (these are reweighting approaches). In some embodiments, there are no hidden layers (that is, zero hidden layers), and the network implements a multilogistic regression. The network is suitably trained using the set of training documents $X_T$ 52, and thereafter is used as the weighting processors 32, 36 (reweighting approaches) or is used as the derived categories module 132 (direct approaches).

The illustrated example embodiments set forth herein are applied to double-view categorizing of documents. Those skilled in the art can readily adapt these embodiments to categorizing objects other than documents, by selecting sets of categories $C^{(1)}$ and $C^{(2)}$ to suitably categorize the objects, and by constructing and training suitable categorization models $M^{(1)}$ and $M^{(2)}$ for categorizing an object respective to each categorization dimension $C^{(1)}$ and $C^{(2)}$. For example, in the case of image objects, image processing techniques can be applied to extract quantitative image characteristics from the image objects that are used as inputs to the categorization models. Audio files can be categorized based on, for example, frequency spectrum characteristics, and so forth.

Moreover, those skilled in the art can readily adapt the illustrated example embodiments to categorization using more than two categorization dimensions. For example, the reweighting approach set forth in Equations (7) and (8) is readily extended from two categorization dimensions to an arbitrary n categorization dimensions. Equation (7) is suitably rewritten for n dimensions as:

$$P(c^1 = i \mid x, M^{(1)}, \ldots, M^{(n)}) = \qquad (13)$$
$$\sum_{k_2} \cdots \sum_{k_n} P(c^{(2)} = k_2 \mid x, M^{(2)}) \ldots P(c^{(n)} = k_n \mid x, M^{(n)}) \cdot$$
$$P(c^{(1)} = i \mid x, M^{(1)}) \cdot P(c^1 = i \mid c^{(2)} = k_2, \ldots, c^{(n)} = k_n),$$

where the indices $k_2, \ldots, k_n$ range over all categories of the $2^{nd} \ldots n^{th}$ dimensions, or alternatively range over only those categories determined a priori to show category interdependencies. The category interdependency reweighting factors $P(c^1=i|c^{(2)}=k_2, \ldots, c^{(n)}=k_n)$ can be estimated analogously as to Equation (12).

It will be appreciated that various of the above-disclosed and other features and functions, or alternatives thereof, may be desirably combined into many other different systems or applications. It will further be appreciated that various presently unforeseen or unanticipated alternatives, modifications, variations or improvements therein may be subsequently made by those skilled in the art which are also intended to be encompassed by the following claims.

The invention claimed is:

1. A computer-implemented method for categorizing an object respective to at least two categorization dimensions, each categorization dimension being defined by a plurality of categories, the computer-implemented method comprising:

determining a probability value indicative of the object for each category of each categorization dimension; and selecting a categorization label for the object respective to each categorization dimension based on (i) the determined probability values of the categories of that categorization dimension and (ii) the determined probability values of categories of at least one other of the at least two categorization dimensions;

wherein the at least two categorization dimensions include first and second categorization dimensions, and the selecting of a categorization label respective to each categorization dimension includes:

weighting the probability values of the categories of the first categorization dimension based on the probability values of the categories of the second categorization dimension to produce weighted probability values for the categories of the first categorization dimension;

weighting the probability values of the categories of the second categorization dimension based on the probability values of the categories of the first categorization dimension to produce weighted probability values for the categories of the second categorization dimension;

selecting the label respective to the first categorization dimension based on the weighted probability values for categories of the first categorization dimension; and selecting the label respective to the second categorization dimension based on the weighted probability values for categories of the second categorization dimension.

2. The method as set forth in claim 1, wherein the determining of a probability value indicative of the object for each category of each categorization dimension includes:

for each categorization dimension, evaluating respective to the object a categorization model corresponding to that categorization dimension to determine the probability values for each category of that categorization dimension.

3. The method as set forth in claim 1, wherein the selecting of categorization labels includes:

weighting the probability values of selected categories of the first categorization dimension based on the probability values of interdependent categories of the second categorization dimension to produce the weighted probability values for the selected categories of the first categorization dimension.

4. The method as set forth in claim 3, wherein the selected categories include all categories defining the first categorization dimension, and the interdependent categories include all categories defining the second categorization dimension.

5. The method as set forth in claim 3, wherein the interdependent categories include less than all of the categories defining the second categorization dimension.

6. The method as set forth in claim 3, wherein the weighting the probability values of selected categories of the first categorization dimension based on the probability values of interdependent categories of the second categorization dimension includes:

determining interdependency weighting factors for ordered pairs of categories, each ordered pair of categories including (i) one of the selected categories of the first categorization dimension, and (ii) one of the interdependent categories of the second categorization dimension.

7. The method as set forth in claim 6, wherein the determining of the interdependency weighting factors includes:

optimizing the interdependency weighting factors for the ordered pairs of categories respective to a set of training objects.

8. The method as set forth in claim 1, wherein the selecting of categorization labels includes:

determining derived probability values for derived categories, each derived category corresponding to an ordered combination of categories from different categorization dimensions, the derived probability value for each derived category being determined based on the probability value of one of the categories of the ordered combination of categories weighted by the probability value of the other one of the categories of the ordered combination;

determining an optimized derived category based on the derived probability values; and selecting a categorization label respective to each categorization dimension corresponding to the optimized derived category.

9. The method as set forth in claim 8, wherein the derived categories include fewer than all ordered pairwise combinations of categories from the first and second categorization dimensions.

10. The method as set forth in claim 8, wherein the weightings performed during the determining incorporate interdependency weighting factors, and the method further includes:

optimizing the interdependency weighting factors respective to a set of training objects prior to the determining of derived probability values.

11. An apparatus for categorizing an object respective to at least two categorization dimensions, each categorization dimension being defined by a plurality of categories, the apparatus comprising:

a memory and a processor;

a categorization model corresponding to each categorization dimension, the object being input to the categorization models to produce a probability value indicative of the object for each category of each categorization dimension; and a labeling module that selects a categorization label for the object respective to each categorization dimension based on (i) the determined probability values of the categories of that categorization dimension and (ii) the determined probability values of categories of at least one other of the at least two categorization dimensions;

wherein the at least two categorization dimensions include first and second categorization dimensions and the labeling module selects a categorization label for the object respective to the first and second categorization dimensions by:

weighting the probability values of the categories of the first categorization dimension based on the probability values of the categories of the second categorization dimension to produce weighted probability values for the categories of the first categorization dimension;

weighting the probability values of the categories of the second categorization dimension based on the probability values of the categories of the first categorization dimension to produce weighted probability values for the categories of the second categorization dimension;

selecting the label respective to the first categorization dimension based on the weighted probability values for categories of the first categorization dimension; and selecting the label respective to the second categorization dimension based on the weighted probability values for categories of the second categorization dimension.

12. The method as set forth in claim 11, wherein the selecting of categorization labels includes:

weighting the probability values of selected categories of at least one selected categorization dimension based on the probability values of interdependent categories of at least one other categorization dimension to produce weighted probability values for the selected categories; and selecting the label respective to each categorization dimension based on the weighted probability values.

13. The method as set forth in claim 12, wherein the weighting incorporates interdependency weighting factors indicative of interdependency between ordered pairs of categories, each ordered pair of categories including (i) one of the selected categories of the at least one selected categorization dimension, and (ii) one of the interdependent categories of the at least one other categorization dimension.

14. The method as set forth in claim 13, further including:

optimizing the interdependency weighting factors for the ordered pairs of categories respective to a set of training objects.

15. The apparatus method as set forth in claim 11, wherein the selecting of categorization labels includes:

determining derived probability values for derived categories, each derived category corresponding to an ordered combination of categories from different categorization dimensions, the derived probability value for each derived category being determined based on the probability value of one of the categories of the ordered combination of categories weighted by the probability value of the other one of the categories of the ordered combination; and selecting an optimized derived category based on the derived probability values and selecting a categorization label respective to each categorization dimension that corresponds to the optimized derived category.

16. The apparatus as set forth in claim 15, wherein the derived categories include fewer than all ordered pairwise combinations of categories from the first and second categorization dimensions.

17. The method as set forth in claim 15, wherein the determining of derived probability values for derived categories employs an interdependency weighting factor associated with each derived category in performing the weighting.

18. A computer-implemented method for categorizing an object, the computer-implemented method comprising:

independently categorizing the object with respect to at least two categorization dimensions each defined by a plurality of categories, the independent categorizing with respect to each categorization dimension being performed independently from the independent categorizing with respect to any other categorization dimension; and adjusting the independent categorization with respect to one categorization dimension based on the independent categorization with respect to another categorization dimension, wherein the adjusting includes:

weighting a probability value assigned by the independent categorizing to a first selected category belonging to the one categorization dimension by a probability value assigned by the independent categorizing to a second selected category belonging to the other categorization dimension; and weighting the probability value assigned by the independent categorizing to a first selected category belonging to the one categorization dimension by an interdependency weighting factor associating the first and second selected categories.

\* \* \* \* \*